No. 629,178. Patented July 18, 1899.
A. P. STEPHENS.
CYCLE DRIVING MECHANISM.
(Application filed Dec. 27, 1897.)
(No Model.)
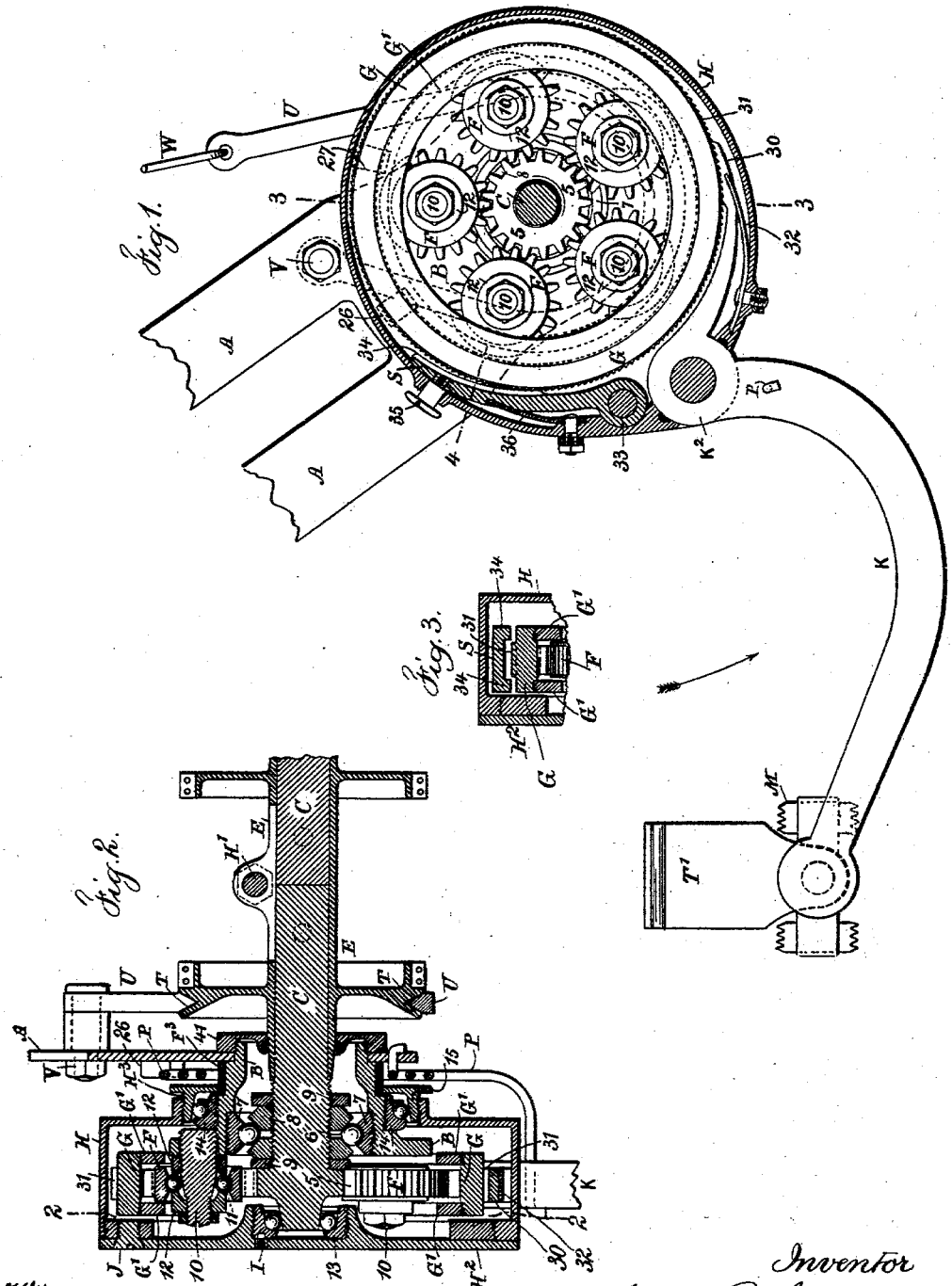
Witnesses
Chas H. Smith
J. Staib
Inventor
Anson P. Stephens
per L. W. Serrell & Son

UNITED STATES PATENT OFFICE.

ANSON P. STEPHENS, OF NEW YORK, N. Y.

CYCLE DRIVING MECHANISM.

SPECIFICATION forming part of Letters Patent No. 629,178, dated July 18, 1899.

Application filed December 27, 1897. Serial No. 663,486. (No model.)

*To all whom it may concern:*

Be it known that I, ANSON P. STEPHENS, a citizen of the United States, residing in the city, county, and State of New York, have invented an Improvement in Cycle Driving Mechanism, of which the following is a specification.

In an application for patent of like date herewith I have represented a means for giving motion to the front wheel of a cycle by a foot-lever and intermediate gearing applied at each side of the driving-wheel, there being a pinion at each end of the axle receiving motion from an internal gear-ring through intermediate pinions, the studs that support such intermediate pinions being upon a stationary axle-box and the internal gear-ring receiving motion from a clamping-strap.

In the present invention I provide ratchet-teeth around the exterior of the internal gear-ring and a pawl upon the foot-lever for engaging such teeth, there being a spring that separates the pawl from the teeth when the pressure upon the foot-lever is removed, and I provide a brake that can be actuated by the foot to apply friction to the internal gear-ring, and I also provide a flange upon the wheel-hub and a brake-strap adapted to being actuated by hand for applying the brake to the front wheel by the handle-bar.

In the drawings, Figure 1 is a sectional elevation at about the line 2 2 of Fig. 2. Fig. 2 is a cross-section at about the line 3 3 of Fig. 1, and Fig. 3 is a cross-section at the line 4.

This improvement may be applied to a cycle of any desired character. Where a single forward driving-wheel is used, the frame-fork is adapted to receive between the fork the hub E of the driving-wheel, and this frame-fork may be of any desired character, either rigid with the main frame or adapted to be turned in steering. A portion of this frame is shown at A, and at the lower end of the fork at each side is an axle-box B, this axle-box being tubular to pass through an eye at the lower end of the frame-fork, in which position it is firmly secured by a nut 41, which is advantageously provided with a dust-guard and felt ring setting closely around the tubular axle of the wheel.

The hub E is of any desired character and provided with flanges or other devices for the spokes of the wheel, and such hub has a tubular center to receive the axle C, which axle is preferably made in two parts, so as to be inserted from the ends into the hub, and the tube of the hub may be split and flattened and provided with ears to receive through the ears the clamp-bolt H', by which the axle is firmly clamped within the tubular hub, and a set-screw may also be provided, passing into a groove or hole in the axle, whereby the axle and hub are firmly connected and rotate together. The clamping-bolt H' being in the middle holds both parts of the axle.

Upon the axle is a pinion 5, and such axle is screw-threaded behind the pinion to receive the bearing-rings 8 and lock-nuts 9, and the balls 6 are between these bearing-rings 8 and the grooved bearing-ring 7, that is screwed within the stationary axle-box B. By this means the axle and wheel are reliably supported within the stationary axle-box, and the parts can be adjusted to allow for wear by screwing one or both rings 8 toward the other and preventing them turning by setting up the lock-nuts.

The stationary axle-box B is made with a front flange receiving through it the studs 10, supporting the intermediate pinions F, and the internal gear-ring G surrounds the intermediate pinions F, the teeth of the pinions and ring interlocking, and it is advantageous to support the intermediate pinions F by ball-bearings, the opening in each pinion being grooved for the balls 11 and the collars 12 being upon the studs 10 at opposite sides of the balls, and the studs 10 are conical or tapering, so that by adjusting the collars 12 wear may be compensated, and lock-nuts are provided at the ends of the studs.

In order to hold the internal gear-ring in position around the intermediate pinions F, it is advantageous to provide such internal gear-ring with guide-flanges G', projecting inward and coming at opposite sides of the intermediate pinions. I have represented the ring G as screw-threaded internally at each side of the teeth of such internal gear, so that the guide rings or flanges G' are screwed into the ring G, which is convenient for allowing the teeth of the internal gear-ring to be properly cut; but one or both of these guide-flanges G' may be made integral with the internal gear-ring.

The case H surrounds the axle-box, the gearing, and the internal gear-ring, and this case has a removable cap H², secured by screws J, and this case receives a turning motion backward and forward around the stationary axle-box, and in order to support this case in position and lessen friction ball-bearings are advantageously employed, the outer ball-bearings 13 intervening between the cap H² and the conical end of the axle C and the inner ball-bearings 14 intervening between the axle-box B and the inner opening of the case, and it is advantageous to construct these ball-bearings so that they may be adjusted.

The outer ball-bearing is represented with a screw-ring within an annular flange upon the inside of the cap H², and this screw-ring can be adjusted to compensate wear and held in position by a screw or pin I, and the inner ball-bearing 14 is provided with a screw-ring H³, passing into the opening in the case H, the surface of which ring is conical to press upon the balls of the bearing, and this ring has a flange extending nearly to the exterior cylindrical surface of the axle-box B, as represented at 15, and a ring of felt or similar material F³ may surround the stationary axle-box and fit the interior of the ring-flange 15 for excluding dust, and there should be a movable screw or pin passing through the flange 15 into the axle-box to prevent the ring-flange unscrewing. The foregoing parts correspond to those in a separate application of this date.

The case H is made with an opening at the lower and rear portion for receiving the knuckle K² of the foot-lever K, and the case and cap may be grooved at this part for the reception of fibrous material to keep out dust, and within the case a pawl 30 projects from the lever and is made with teeth near its end which engage similar teeth 31 around the exterior of the internal gear-ring G, and the case at this part is shaped so as to allow of the movement of the pawl in engaging the teeth or being moved back from such teeth for disconnecting the pawl from such teeth, and the spring 32 within the case is sufficiently strong to hold the pawl 30 out of engagement with the teeth 31; but this spring yields to the pressure upon the pedal M.

It will now be understood that when a downward movement is given to the foot-lever the pawl 30, engaging the teeth 31, causes the internal gear G to move along with the foot-lever and the case, and in so doing motion is given through the intermediate pinions and the axle-pinion to the driving-wheel to propel the cycle, and when the pressure upon the pedal is relieved and the foot-lever raised by the action of the foot on the toe-clip T' or by a return-spring at P the foot-lever and case are moved in the opposite direction, the pawl being out of contact with the teeth of the internal gear-ring, so that such ring is free to continue its movement under the action of the foot-lever and the parts at the other side of the driving-wheel, and by acting upon the foot-levers alternately the continuous movement is given to the driving-wheel, and it is advantageous to allow one foot-lever to rise rapidly by the action of the spring or the toe-clip, so that one lever commences to give the propelling power before the other foot-lever commences the upward movement.

It is advantageous to make the teeth 31 upon the internal gear-ring in the middle portion of the periphery and to leave the said ring smooth at each side of such teeth, as seen in Fig. 3, in order that a brake may be applied to this smooth peripheral portion of the internal gear-ring. This brake is represented at S in the form of a segment pivoted at 33 within the case H, and the moving end portion of the brake S is provided with contact-blocks 34, of leather or other suitable material, that press upon the smooth surfaces of the internal gear-ring, and the projecting stud 35, that passes from the brake S through a hole in the case H, can be acted upon by the foot of the rider to press the brake against the ring G and apply a detaining force to the cycle, and the spring 36 acts to lift the brake from the ring G when the pressure of the foot is relieved.

In coasting the rider can place the feet upon the studs that project from the cases at the respective sides of the machine and exert the pressure necessary under ordinary circumstances for regulating the speed of the cycle; but it is advantageous to provide in addition an emergency brake controlled by the handle-bar, so as to regulate the movement of the machine. With this object in view a flange T is provided advantageously upon one end of the wheel-hub E, and this flange may be either cylindrical or V-shaped in section and receive around it a brake-band U, one end of which is connected with the cycle-frame at V and the other end is provided with a cord, chain, or strap W, passing up to the handle-bar, so that by turning the handle-bar or by applying a lever between the handle-bar and the strap such strap can be pulled upon with the necessary force for grasping the brake-flange T and checking the momentum of the cycle, and the brake-band U should be expansive, so that when the pull on the cord or strap W is relieved the brake will expand and remain substantially out of contact with the flange T. This strap or connection W may be actuated by any suitable device.

In order to raise the foot-lever K, I find it advantageous to employ a volute spring P, the inner end of which is connected with the frame-fork A or axle-box B, and the outer end is connected with the foot-lever K, preferably by passing into a hole therein, and the spring is coiled, so that by its resiliency the foot-lever K will be raised and the case H simultaneously turned, and when this return-spring is provided the spring 32 may be dispensed with, because the action of the volute spring K will be to swing the foot-lever in such a direction as to separate the pawl from the teeth upon the internal gear-ring.

It is advantageous to provide stops 26 and 27 to limit the turning movement of the case, so that the return-spring may not be unduly strained by pressure from the foot.

In consequence of the clamping-bolt H' being between the spoke-flanges of the wheel the frame-forks can come closely adjacent to such spoke-flanges, so as to lessen the spread of the frame-forks The ordinary toe-clamp on the pedal M may be made use of; but it is usually advantageous to have the toe-clamp on the pedal at the side adjacent to the wheel extending up over the toes of the foot, so that the foot can be inserted laterally beneath such toe-clamp, and there will be no looseness as the foot is raised in raising the foot-lever between one downward movement and the next.

In my application, Serial No. 663,485, filed December 27, 1897, the foot-lever is represented as actuating the case and gear-ring, the parts being connected by suitable mechanism. In the present instance the foot-lever is provided with a pawl and teeth to engage teeth upon the exterior of the gear-ring, and the aforesaid application, Serial No. 663,485, is to be regarded as having the broadest claims overlapping the devices in the present application.

I claim as my invention—

1. The combination with the axle of the driving-wheel, of an internally-toothed gear-ring and gearing between the same and the axle, a case and a support on which the same can be turned around with the internal gear-ring, a lever pivoted upon the case, a pawl acted upon by the lever and engaging the exterior of the gear-ring, and a brake supported by the case and adapted to apply pressure to the gear-ring, substantially as set forth.

2. The combination with an internal gear-ring, the wheel, axle, pinion and intermediate gears, of a foot-lever and a pawl engaging the internal gear-ring, and a case upon which the foot-lever is pivoted, such case being adapted to turn around the axle by the action of the foot-lever, a brake within the case and having a projecting stud to be acted upon by the pressure of the foot, substantially as set forth.

3. The combination with the cycle-wheel and the frame-fork, of a stationary axle-box upon the frame-fork, a case supported by and turning upon the axle-box, gearing within the case for driving the cycle-wheel, a lever pivoted upon the case and a pawl within the case for engaging the gearing, such lever extending to the rear whereby the wheel is driven by the movement of the lever, the pawl engaging the gearing upon the downward movement of the lever, a brake within the case pivoted at one end and acting at the other end against the gear, and a stud projecting through the case to be pressed upon by the foot, and a spring to lift the brake, substantially as set forth.

4. The combination with the spoke-flanges of the wheel and the tubular hub connecting such flanges and split longitudinally between the flanges, of ears upon the tubular hub at opposite sides of the longitudinal split, a bolt passing through the ears and an axle made in two parts and entered from opposite ends into the tubular hub and clamped by the bolt so that the pinion upon the end of each half-axle can be made integral with such axle, substantially as set forth.

Signed by me this 22d day of December, 1897.

ANSON P. STEPHENS.

Witnesses:
GEO. T. PINCKNEY,
S. T. HAVILAND.